BENJAMIN F. LYFORD.
Improvement in Oyster-Nurseries.

No. 127,903. Patented June 11, 1872.

Witnesses
John L. Boone
C. M. Richardson

Inventor
Benj. F. Lyford M.D.

UNITED STATES PATENT OFFICE.

BENJAMIN F. LYFORD, OF SAN FRANCISCO, CALIFORNIA.

IMPROVEMENT IN OYSTER-NURSERIES.

Specification forming part of Letters Patent No. 127,903, dated June 11, 1872.

SPECIFICATION.

*To all whom it may concern:*

Be it known that I, BENJAMIN F. LYFORD, of San Francisco, San Francisco county, State of California, have invented Improvements in Nursing and Propagating Oysters; and I do hereby declare the following description and accompanying drawing are sufficient to enable any person skilled in the art or science to which it most nearly appertains to make and use my said invention or improvements without further invention or experiment.

The principal object of my invention is to provide a proper nursery for young oysters, in which they may be kept until they are large enough to be transplanted, so as to prevent their being carried out to sea by the tides. The invention also relates to an improved method of transplanting or forming artificial beds after the oyster has attained a size sufficient to permit of its being exposed to the open waves.

In some countries, especially upon the Pacific coast, it has heretofore been found impossible to propagate oysters, to account for which failure various causes have been assigned. My experiments, however, have demonstrated that the young oyster, after being liberated from the parent shell, floats about in the water a certain time before it adheres to any substance, and that during this period it is carried away by the tides.

My invention consists in providing improved artificially-prepared nursery-ponds, in which a number of full-grown oysters are kept during the period of casting their spat. These ponds or nurseries are so arranged that the spat or young oysters will be provided with a regular supply of fresh sea-water, but yet be prevented from being carried away by the tides. Suitable substances are provided for the oysters to adhere to as soon as they are ready to locate, and when they have grown to a sufficient size to transplant it will only be necessary to remove the substances to which they are fixed to the growing-beds.

In order to more fully illustrate and describe my invention, reference is had to the accompanying drawing forming a part of this specification, in which—

Figure 1:
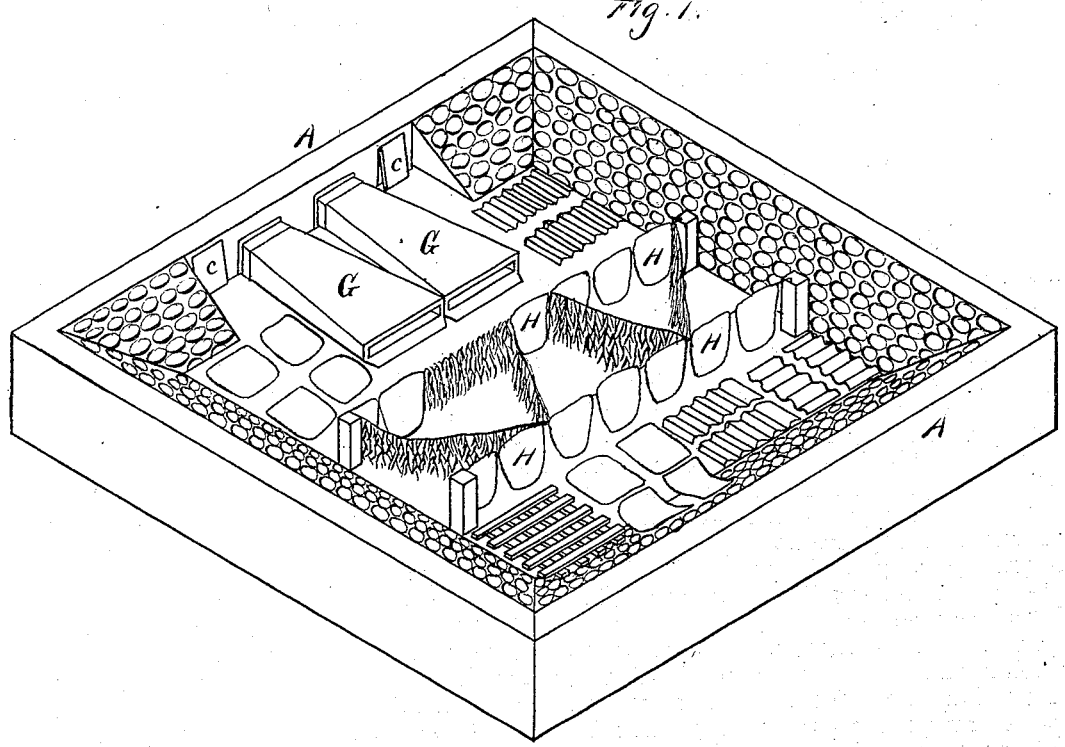
Figure 2:
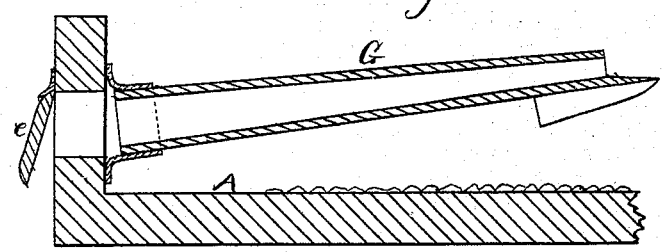

Figure 1 is a perspective view of the nursery. Fig. 2 is an enlarged view of an exit-gate.

Figure 3:
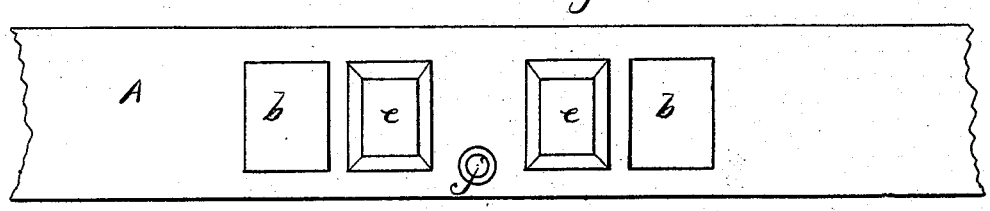

A represents an inclosed pond or lagoon, which may be constructed in any convenient locality adjacent to the growing oyster-beds. Generally I would prefer to inclose with a proper wall a small bay or arm of the sea, which is partially filled with water at high tide. The wall should be high enough to prevent the waves from dashing over it. In the seaward wall I leave openings $b$ $b$, Fig. 3, and secure on the inside of the wall a valve, $c$, to cover each of the openings. These valves will admit water into the pond or inclosure through the opening $b$, but prevent its return through them. In the same wall I also leave other openings, which are covered upon the outside by valves $e$, which open outward so as to provide exit-passages for the water. These openings are arranged or located at a height from the bottom of the pond or nursery sufficient to keep the necessary quantity of water in the inclosure to supply the oysters at ebb-tide. My experiments and observations also show that the spat or small oysters pass the first three or four days after being cast out of the parent shell below the surface of the water, and mostly close to the bottom, and in order to prevent their being carried out of the pond through the exit-openings by the receding tide, I provide for each of the exit-openings a skimmer, G, which allows the surface-water to gradually escape as the tide recedes, while the water at the bottom in which the oysters keep themselves remains in the pond. These skimmers each consist of a flat wide-mouthed or hopper-shaped tube, the smaller end of which is secured about the exit-openings by a flexible material, which will allow the opposite or widest end to float to the surface. The wide end of these skimmers can be weighted so as to regulate their skimming capacity as desired. By this means the lowering of the water in the pond as the tide recedes will be accomplished by removing the surface-water, while that below the level of the valves remains undisturbed. The bottom of the pond I cover with shells, rocks, or other suitable paving substances, in order to render the pond cleanly, and at suitable distances apart I suspend, bottom up, gunny-sacks H, or other fibrous fabric. Upon the bottom of the pond I place various substances and articles, such as fresh shells, pieces of grooved tile, brush, woven fabrics, or any material or article to which the small oysters will be likely to adhere. These articles are arranged in such a manner that a sufficiency of light and shade will be provided in the bottom of the pond. Near the bottom of the seaward wall I make an opening, $j$, which will be usually stopped with a plug. This hole serves to draw off the water in the pond at suitable times after the oysters have located themselves, in order to cleanse it of any accumulations which may be formed upon its bottom or be carried in by the tide, and also to draw off any enemy of the oysters which may have been generated therein or carried in through the openings.

After the oysters have attained a sufficient size to permit of their being transplanted to the growing-beds, I take up the substances or articles in the pond to which they have fixed themselves, and break or cut the substance or article into pieces, according to the position and number of oysters upon them, so as not to crowd them too closely together while completing their growth. These pieces I then scatter about in an estuary or upon a suitable beach, and leave them, in order to allow the oysters, now fixed and of good size, to finish their growth and fatten.

By this means I am able to propagate and cultivate oysters in places where their reproduction has heretofore been attempted and abandoned.

Other species of shell-fish can also be propagated and cultivated in the artificial nursery-pond above described.

Having described my invention, what I claim, and desire to secure by Letters Patent, is—

1. The inclosed artificial nursery-pond A, having its bottom paved, and its interior provided with gunny-sacks H or with other suitable substances and materials upon which the oysters will adhere, in combination with the floating skimmers G, substantially as and for the purpose above described.

2. The inclosed artificial pond A, located in a position to be entered by the rising tide, and having its seaward wall provided with automatic entrance-valves $b$ and exit-valves $e$ provided with floating skimmers, substantially as and for the purpose above described.

3. The floating skimmers G, connected with the exit-openings $e$ by a flexible joint, substantially as and for the purpose above described.

In witness whereof I hereunto set my hand this 7th day of February, A. D. 1872.

BENJAMIN F. LYFORD, M. D.

Witnesses:
J. L. BOONE,
C. M. RICHARDSON.